United States Patent [19]

Wimberger Friedl et al.

[11] Patent Number: 5,424,389

[45] Date of Patent: Jun. 13, 1995

[54] POLYCARBONATE COPOLYMER OF SPIROBISINDAN AND BISPHENOL-A, METHOD OF PREPARING SUCH A COPOLYMER AND OPTICAL COMPONENTS OF SUCH A COPOLYMER

[75] Inventors: Reinhold Wimberger Friedl; Harmannus F. M. Schoo; Johan G. De Bruin, all of Eindhoven, Netherlands

[73] Assignee: U.S. Philips Corporation, New York, N.Y.

[21] Appl. No.: 226,614

[22] Filed: Apr. 12, 1994

[30] Foreign Application Priority Data

Apr. 23, 1993 [EP] European Pat. Off. .......... 93201187

[51] Int. Cl.⁶ .............................................. C08G 64/00
[52] U.S. Cl. ................................. 528/201; 528/196; 528/198
[58] Field of Search ..................... 528/196, 198, 201

[56] References Cited

FOREIGN PATENT DOCUMENTS 0287887 10/1988 European Pat. Off. .

*Primary Examiner*—John Kight, III
*Assistant Examiner*—Terressa Mosley
*Attorney, Agent, or Firm*—Norman N. Spain

[57] ABSTRACT

A polycarbonate copolymer of a spirobisindan (6,6'-dihydroxy-3,3,3',3'-tetramethyl-1,1'-spirobisindan) and bisphenol-A in which the mole fraction of the spirobisindan $\alpha$ ranges between 0.844 and 0.887 is provided. Such a copolymer has a stress-optical coefficient $C_m$ in the melt which is equal to zero or substantially equal to zero, so that the sensitivity of the polymer to orientation birefringence is very small. Such a copolymer can be rendered optically isotropic and is very suitable for use in optical components in which birefringence is undesirable. Examples of such optical components are lenses and substrates for optical information media.

5 Claims, 1 Drawing Sheet

POLYCARBONATE COPOLYMER OF SPIROBISINDAN AND BISPHENOL-A, METHOD OF PREPARING SUCH A COPOLYMER AND OPTICAL COMPONENTS OF SUCH A COPOLYMER

BACKGROUND OF THE INVENTION

The invention relates to a polycarbonate copolymer of spirobisindan and bisphenol-A.

The invention also relates to a method of preparing such a copolymer.

The invention further relates to an optical component of such a copolymer, in particular a substrate for an optical information carrier, notably a substrate for a magneto-optical information carrier. The invention also relates to a magneto-optical recording medium.

Polycarbonate (PC) on the basis of 2,2-bis(4-hydroxyphenyl)propane, in literature commonly referred to as bisphenol-A, is used in optical products because it has excellent thermal and mechanical properties and a low water absorption. Moreover, the material is transparent for a broad wavelength range. Products such as substrates for optical information carriers are generally manufactured by injection moulding or compression moulding polycarbonate at an increased temperature (at least above the glass-transition temperature $T_g$). Such moulding processes causes the polycarbonate to become anisotropic. This is because, during injection moulding or compression moulding of polycarbonate, large pressure and temperature gradients develop which lead to molecular orientation and stresses. During cooling in the mould, these stresses and molecular orientations are frozen-in, so that the polycarbonate becomes optically anisotropic. This manifests itself in birefringence of the material. In a birefringent material a light ray is split into two plane-polarized light rays (referred to as ordinary and extraordinary ray) whose planes of polarization extend perpendicularly to each other. Both light rays have a different refractive index in the material. The difference in refractive index $\Delta n$ is referred to as birefringence. The difference in path length between the ordinary and extraordinary light ray is referred to as optical retardation T and is proportional to $\Delta n$. This birefringence leads to astigmatism of a light beam. Birefringence is particularly disadvantageous in MO (magneto-optical) recording, because reading of an MO medium is based on the detection of the very small (Kerr)rotation of the plane of polarization of a polarized laser light beam.

It has been found that in the polymeric melt (temperature $> T_g$) the birefringence ($\Delta n$) is proportional to the applied stress ($\Delta \sigma$):

$$\Delta n = C_m \cdot \Delta \sigma$$

The stress-optical coefficient ($C_m$) is proportional to the anisotropy of the polymer chains. The applied voltage causes the polymer chains to become oriented; the material becomes anisotropic, which leads to birefrigence. This orientation is frozen-in when the temperature falls below $T_g$. Also in the glass state (temperature $< T_g$) there is a linear relation between the applied voltage and birefringence, however, the proportionality constant $C_g$ is different.

In an injection-moulded product the birefringence is predominantly caused by orientation of the polymer chains. This birefringence is referred to as orientation birefringence. Thermal stresses developing at a temperature below $T_g$ are generally small and relax with time. The contribution of the molecular orientation to the birefrigence depends on the degree of orientation of the polymer chains and the optical anisotropy inherent in polymer chains. The orientation can be reduced by employing high melting and mould temperatures and by using a polymer having a molecular mass which is as small as possible. The intrinsical anisotropy is determined by the molecular configuration and conformation, in particular the spatial distribution of the polarizable electrons. The polarizability of most polymer molecules is higher in the chain direction than in the direction perpendicular thereto. In this case, there is a positive anisotropy which manifests itself in a positive value of $C_m$. The value of $C_m$ is a measure of the sensitivity of a polymer to orientation birefringence. It follows from the above that in order to obtain an optically intrinsically isotropic polymer the value of $C_m$ should be zero or substantially zero. Bisphenol-A-polycarbonate (Bis-A PC) has a positive, high $C_m$ value ($+55.10^{-10}$ $Pa^{-1}$ or $+5500$ Brewsters). Polymers having highly polarizable side groups, such as polystyrene, have a negative anisotropy.

An optically isotropic polymer can be obtained by mixing polymers having a positive anisotropy and polymers having a negative anisotropy in the proper ratio. A prerequisite condition is that the polymers must be miscible. For example, Bis-A PC and polystyrene are immiscible. Also copolymerization of the proper quantities of monomers having a positive anisotropy and monomers having a negative anisotropy can yield an optically isotropic material. Another way of reducing the intrinsical anisotropy of a polymer is by providing substituents on the polymer chains.

In European Patent Application EP-A-287887, a description is given of a polycarbonate on the basis of spirobisindan bisphenol, namely 6,6'-dihydroxy-3,3,3',3'-tetramethyl-1,1'-spirobisindan (SBI), hereinafter referred to as spiro-PC. In said European Patent Application, it is stated that a homopolymer of SBI has a birefringence equal to 0 and that copolymerization with bisphenol-A causes the birefringence to increase (Table III) and $T_g$ Table II) to decrease. However, said Patent Application does not state how the birefringence was determined. The polymer molecules may be oriented parallel to the substrate surface, so that, despite the fact that the material is anisotropic, a perpendicularly incident light beam exhibits a very small birefringence. However, under operating conditions, i.e. with a convergent light beam, birefringence does occur. A convergent light beam comprises, inter alia, rays having an angle of incidence of for example 30°, resulting in anisotropy manifesting itself.

Measurements carried out by Applicant have shown, however, that the homopolymer of SBI (spiro-PC) is not optically isotropic, but instead has a negative $C_m$ value of $-650.10^{-12}$ $Pa^{-1}$ ($-650$ Brewsters). In this homopolymer, a convergent light beam exhibits birefringence.

SUMMARY OF THE INVENTION

It is an object of the invention to provide, inter alia, a polycarbonate copolymer whose absolute value of the stress-optical coefficient $C_m$ of the melt is maximally $100 \ 10^{-12}$ $Pa^{-1}$ (100 Brewsters). The invention also aims at providing a method of preparing such a copolymer. The invention further aims at providing an optical component, in particular a substrate for an optical information carrier, which is made from such a copolymer.

According to the invention, this object is achieved by a polycarbonate copolymer of spirobisindan (SBI) and bisphenol-A in accordance with FIG. 3, in which $0.844 \leq \alpha \leq 0.887$. In said Figure, the notation "Co" indicates that a random copolymer is meant rather than a block copolymer. By copolymerizing SBI (having a negative $C_m$-value) with bisphenol-A (having a positive $C_m$-value) in the proper ratio, an intrinsically isotropic copolycarbonate is obtained having a $C_m$-value equal to 0. For most optical applications a maximum absolute $C_m$-value of $100.10^{-12} Pa^{-1}$ (100 Brewsters) is suitable. In the case of an SBI mole fraction of 0.844, the $C_m$-value is $+100.10^{-12} Pa^{-1}$ (+100 Brewsters); in the case of an SBI mole fraction of 0.887, the $C_m$-value is $-100.10^{-12} Pa^{-1}$ (-100 Brewsters). $C_m$ becomes 0 at an SBI mole fraction of 0.865. Polycarbonate copolymers of SBI and bisphenol-A having the indicated mole fractions are intrinsically isotropic or substantially isotropic and exhibit no birefringence as a result of the orientation of the polymer molecules. The copolymer thus obtained has a $T_g$ of 230° C.

The object of providing a method of preparing such a polycarbonate copolymer is achieved in accordance with the invention by making bisphenol-A and SBI react in a molar ratio of from 11.3:88.7 to 15.6:84.4, respectively, in accordance with the known method as described in the above-mentioned European Patent Application EP-A-287887. In accordance with said known method, phosgene gas is passed through a mixture of bisphenol-A, SBI, an organic solvent and basic water. After said phosgene gas and said mixture have reacted to form polycarbonate copolymer, the organic phase is separated and washed with water. The polymer solution is then precipitated in methanol. The copolymer is separated and then dried. By reacting bisphenol-A and SBI in the above-mentioned molar ratio, the copolymer in accordance with the invention is obtained.

The thus obtained polycarbonate copolymer in accordance with the invention is intrinsically optically isotropic and, in addition, has a high value of $T_g$. Consequently, it can very suitably be used in optical components which must be optically isotropic, so that the birefringence is nil. Examples of such optical components are lenses as used in optical playback equipment such as Compact Disc players and players which are used for optical recording and reproduction, but also beam splitters and gratings for such playback equipment. Said products can be obtained in known manner by injection moulding or compression moulding.

The polycarbonate copolymer in accordance with the invention can very suitably be used for substrates of optical information carders, in particular optical information carriers for MO (magneto-optical) recording. Such substrates are mostly disc-shaped and, in a typical example, have a diameter of 12 cm and a thickness of 1.2 mm. These substrates can be manufactured in known manner by injection moulding or compression moulding. In MO-recording, the state of polarization of light is used as a signal, so that birefringence of the substrate adversely affects the detection of this signal. Such birefringence is essentially absent from the substrates of the invention.

DETAILED DESCRIPTION OF THE INVENTION

An MO recording medium in accordance with the invention comprises a substrate of said polycarbonate copolymer to which a recording layer of, for example, GdTbFe or TbFeCo is applied. In a typical example, the substrate is disc-shaped and has a thickness of 1.2 mm. In general, the substrate surface is provided with a spiral-shaped servo track. The medium may comprise a metal reflection layer of, for example, Au, Ag, Al or Cu. A dielectric layer of, for example, AlN or $Si_3N_4$ may be located between the reflection layer and the recording layer. Such a dielectric layer may also be present between the substrate and the recording layer. The reflection layer is generally coated with a protective layer of a light-curable lacquer. By virtue of the absence of birefringence in the substrate, also in the case of convergent laser light beams, detection of the state of polarization of the laser light (Kerr effect) can take place in an undisturbed manner.

Figure 1:
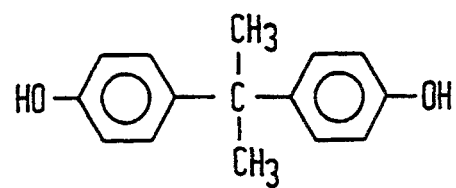
FIGS. 1-3 are structural formulae of the copolymer of the invention and reactants employed in forming this copolymer.
Figure 2:
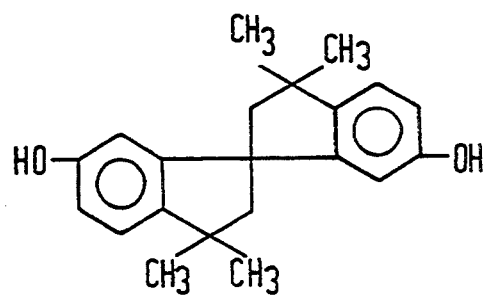
Figure 3:
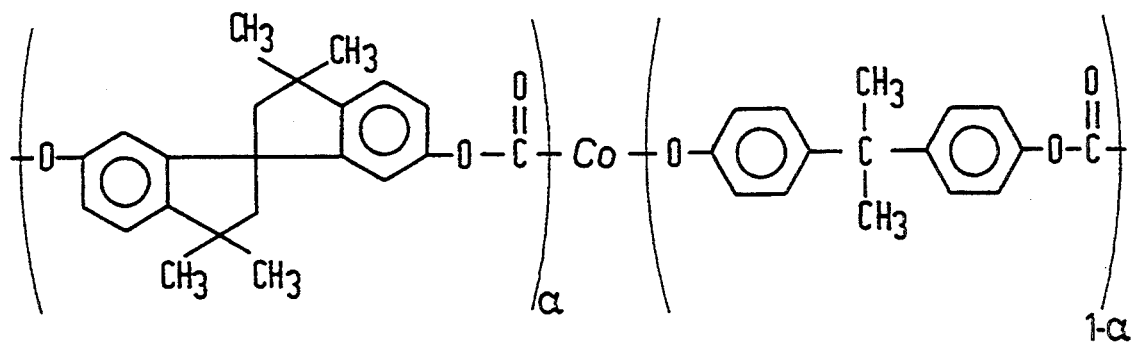

The invention will be explained in greater detail by means of an exemplary embodiment and drawings, in which FIG. 1 shows the structural formula of bisphenol-A, FIG. 2 shows the structural formula of 6,6'-dihydroxy-3,3,3',3'-tetramethyl-1,1'-spirobisindan (SBI), and FIG. 3 shows the structural formula of the polycarbonate copolymer of bisphenol-A and spirobisindan.

Exemplary Embodiment 1

A mixture of 0.525 g (2.3 mmol) bisphenol-A (see FIG. 1; supplier Aldrich) and 4.475 g (14.5 mmol) SBI (see FIG. 2) in 45 ml dichloromethane and 30 ml demineralised water is made alkaline by means of a saturated NaOH solution in water. The pH of the aqueous phase is maintained between 10 and 11. The preparation of SBI is described in an article by K. C. Stueben in J. Polymer Sci., Part A, Vol. 3, pp. 3209-3217 (1965). The mixture is contained in a reaction vessel which is accommodated in a water bath having a temperature of 30° C. The mixture is stirred vigorously for 10 minutes while nitrogen is passed through it. Subsequently, phosgene gas is introduced at a rate of 90 cm³/minute until there is no solid left in the reaction mixture. Minimally 2 equivalents of phosgene are added relative to the overall quantity of bisphenols. The pH is continuously maintained between the above-mentioned values by adding saturated NaOH solution. Subsequently, 0.525 g bisphenol-A and 4.475 g SBI are again added to the reaction mixture after which phosgene is again introduced in the manner described above. After passing nitrogen through it for 5 minutes, 1.5 ml of a 0.47 molar solution of triethylamine in dichloromethane is added and the mixture is stirred for 5 minutes. Subsequently, 0.5 equivalent of phosgene is passed through it at a rate of 45 cm³/minute, the pH-value being maintained at 10. The organic phase is separated, diluted with 50 ml dichloromethane and washed with a diluted aqueous hydrochloric acid solution (5 wt. % HCl) and subsequently twice with water. The polymer solution is precipitated in 500 ml methanol. The polymer is dried and again dissolved in 150 ml chloroform to which 100 ml of methanol is added drop-wise while stirring vigorously. In this process, a concentrated polymer phase is separated which is further precipitated in a blender filled with methanol. The grains are dried in a vacuum oven at 60° C. The yield is 8.5 g of the random copolymer in accordance with FIG. 3, in which $\alpha=0.863$. The weight-averaged molecular weight $M_w$ is 59.000. $T_g$ is determined by differential scanning calorimetry at a warming-up rate of 10 K/minute and amounts to 230° C. The stress-optical coefficient in the glass phase $C_g$ is determined at room temperature by subjecting a plane-parallel, compression-moulded 0.2 mm thick test plate of the polymer obtained to a tensile load and determining the birefringence as a function of the applied force. $C_g$ is then determined from:

$$C_g = \Gamma \cdot w / F, \text{ where } \Gamma = \Delta n \cdot d$$

In said equation, w and d are the width and the thickness, respectively, of the test plate and F is the force applied. The other symbols have the above-mentioned meaning. The optical retardation $\Gamma$ is determined by means of a polarization microscope provided with a Berek compensator.

The stress-optical coefficient in the melt $C_m$, is determined by making an identical test plate creep under a constant force at 15° C. above $T_g$ until an elongation of 50% is attained and allowing it to cool to room temperature under the same force. $C_m$ is locally determined from:

$$C_m = \Gamma \cdot w \bar{d} / (d, F)$$

In this equation, $\bar{d}$ is the average thickness at the point of measurement. The polycarbonate copolymer obtained, in which $\alpha=0.863$, has a $C_g$ of $27 \cdot 10^{-12}$ Pa$^{-1}$ and a $|C_m| \leq 35 \cdot 10^{-12}$ Pa$^{-1}$. With the sample dimensions and measuring equipment used, the sensitivity of the measurement of $C_m$ is 35 Brewsters.

Exemplary Embodiment 2

In a manner which is analogous to that of exemplary embodiment 1, a polycarbonate copolymer in accordance with FIG. 3, in which $\alpha=0.887$, is prepared by correspondingly adapting the mixing ratio of SBI and bisphenol-A. $C_g$ is $24 \cdot 10^{-12}$ Pa$^{-1}$ and $C_m = -100 \cdot 10^{-12}$ Pa$^{-1}$ Exemplary Embodiment 3

In a manner analogous to that of exemplary embodiment 1, a polycarbonate copolymer in accordance with FIG. 3, in which $\alpha=0.844$, is prepared by correspondingly adapting the mixing ratio of SBI and bisphenol-A. $C_g$ is $26 \cdot 10^{-12}$ Pa$^{-1}$. $C_m$ has changed sign and amounts to $+100 \cdot 10^{-12}$ Pa$^{-1}$.

COMPARATIVE EXAMPLE 1

A copolymer in which $\alpha<0.844$ (that is, the mole fraction SBI in the copolymer is less than 84.4%) leads to $C_m > +100 \cdot 10^{-12}$ Pa$^{-1}$ and does not meet the requirements of the invention.

COMPARATIVE EXAMPLE 2

A copolymer in which $\alpha>0.887$ leads to $C_m < -100 \cdot 10^{-12}$ Pa$^{-1}$ and does not meet the requirements of the invention.

COMPARATIVE EXAMPLE 3

In a manner analogous to that of exemplary embodiment 1, the homopolymer of SBI (Spiro-PC) is prepared by omitting bisphenol-A from the reaction mixture. $C_g$ is $20 \cdot 10^{-12}$ Pa$^{-1}$ and $C_m = -650 \cdot 10^{-12}$ Pa$^{-1}$. The homopolymer of SBI is sensitive to orientation birefringence, The Table below lists the measured stress-optical coefficients of different polycarbonate polymers. Bis-A PC is a commercially available homopolymer of bisphenol-A (type CD2000 by Bayer). The $C_m$ and $C_g$ values are listed in Brewsters ($10^{-12}$ Pa$^{-1}$).

TABLE

| polycarbonate | $C_g$ | $C_m$ |
|---|---|---|
| Bis-A PC | 89 | 5500 |
| Spiro PC (homopolymer of SBI) | 20 | −650 |
| Bis-A/spiro (copolymer $\alpha = 0.887$) | 24 | −100 |
| Bis-A/spiro (copolymer $\alpha = 0.863$) | 27 | ≦35 |
| Bis-A/spiro (copolymer $\alpha = 0.844$) | 26 | +100 |

A polycarbonate copolymer of spirobisindan (SBI) and bisphenol-A, the mole fraction $\alpha$ of spirobisindan ranging between 0.844 and 0.877, has a stress-optical coefficient in the melt $C_m$ which maxially has an absolute value of 100 and, hence, is insensitive to orientation birefringence. Said copolymer can very suitably be used for optical components which must exhibit no or hardly any birefringence.

We claim:

1. A polycarbonate copolymer of spirobisindan and bisphenol-A, which copolymer has the following composition:

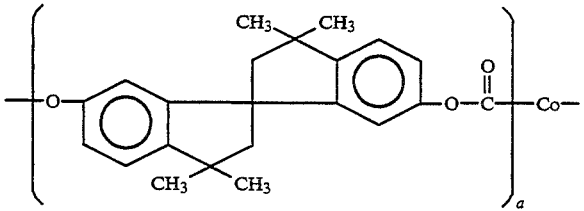

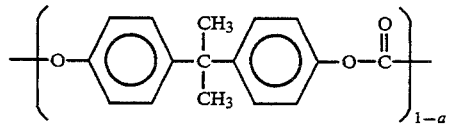

where $0.844 \leq \alpha \leq 0.887$, and the absolute value of the stress-optical coefficient $C_m$ is maximally $100 \cdot 10^{-12}$ Pa$^{-1}$ at a temperature above the glass transition temperature $T_g$.

2. An optical component, at least the optical functional part of which comprises the copolymer as claimed in claim 1.

3. A substrate of copolycarbonate for an optical information carrier, characterized in that the copolycarbonate is a copolymer as claimed in claim 1.

4. An optical information carrier comprising a substrate as claimed in claim 3.

5. A magneto-optical recording medium comprising a substrate and a magneto-optical recording layer, characterized in that the substrate is manufactured from a polycarbonate copolymer as claimed in claim 1.

* * * * *